US011379925B1

(12) United States Patent
Davis

(10) Patent No.: US 11,379,925 B1
(45) Date of Patent: *Jul. 5, 2022

(54) SYSTEMS AND METHODS FOR ALLOCATING FAULT TO AUTONOMOUS VEHICLES

(71) Applicant: State Farm Mutual Automobile Insurance Company, Bloomington, IL (US)

(72) Inventor: Timothy Joel Davis, Chicago, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/093,390

(22) Filed: Nov. 9, 2020

Related U.S. Application Data

(63) Continuation of application No. 15/209,971, filed on Jul. 14, 2016, now Pat. No. 10,832,331.
(60) Provisional application No. 62/360,738, filed on Jul. 11, 2016.

(51) Int. Cl.
| | |
|---|---|
| *G06Q 40/08* | (2012.01) |
| *G05D 1/00* | (2006.01) |
| *G07C 5/08* | (2006.01) |
| *G07C 5/02* | (2006.01) |
| *G01W 1/00* | (2006.01) |
| *G01C 21/28* | (2006.01) |

(52) U.S. Cl.
CPC ............ *G06Q 40/08* (2013.01); *G01C 21/28* (2013.01); *G01W 1/00* (2013.01); *G05D 1/0088* (2013.01); *G07C 5/02* (2013.01); *G07C 5/08* (2013.01)

(58) Field of Classification Search
USPC .................................................. 705/35–45, 4
See application file for complete search history.

(56) References Cited

U.S. PATENT DOCUMENTS

| | | | |
|---|---|---|---|
| 6,906,623 B2 | 6/2005 | Bauer et al. | |
| 8,700,434 B1* | 4/2014 | DeLong ................. | G06Q 10/10 705/4 |
| 8,781,669 B1* | 7/2014 | Teller ..................... | G05D 1/021 701/25 |
| 8,799,034 B1* | 8/2014 | Brandmaier ........... | G07C 5/008 705/4 |
| 8,954,226 B1 | 2/2015 | Binion et al. | |
| 9,019,092 B1 | 4/2015 | Brandmaier et al. | |
| 9,053,516 B2 | 6/2015 | Stempora | |

(Continued)

OTHER PUBLICATIONS

Hevelke A, Nida-Rümelin J. Responsibility for crashes of autonomous vehicles: an ethical analysis. Sci Eng Ethics. 2015;21(3): pp. 619-630. (Year: 2015).*

(Continued)

*Primary Examiner* — Mohammad Z Shaikh
(74) *Attorney, Agent, or Firm* — Armstrong Teasdale LLP

(57) ABSTRACT

In one aspect, a system for allocating fault in a collision involving a vehicle is provided. The system may include (1) a sensor coupled to the vehicle and configured to collect contextual data related to the collision, (2) a non-transitory memory configured to store the contextual data, and (3) a processor coupled to the non-transitory memory and configured to (a) gain access to the contextual data, and (b) compute and assign a fault percentage to a driver of the vehicle based upon the contextual data.

18 Claims, 5 Drawing Sheets

(56) References Cited

U.S. PATENT DOCUMENTS

| | | | |
|---|---|---|---|
| 9,147,219 B2 | 9/2015 | Binion et al. | |
| 9,147,353 B1 | 9/2015 | Slusar | |
| 9,176,500 B1* | 11/2015 | Teller | B60W 30/00 |
| 9,275,417 B2 | 3/2016 | Binion et al. | |
| 9,361,650 B2 | 6/2016 | Binion et al. | |
| 9,390,451 B1 | 7/2016 | Slusar | |
| 9,475,496 B2* | 10/2016 | Attard | B60W 30/182 |
| 9,481,366 B1* | 11/2016 | Gordon | G05D 1/0088 |
| 9,646,428 B1* | 5/2017 | Konrardy | G06F 30/20 |
| 9,646,531 B2* | 5/2017 | Yamazaki | F21V 23/001 |
| 9,715,711 B1* | 7/2017 | Konrardy | G08G 1/143 |
| 9,754,325 B1* | 9/2017 | Konrardy | G07C 5/08 |
| 9,792,656 B1* | 10/2017 | Konrardy | G08B 21/06 |
| 9,858,621 B1* | 1/2018 | Konrardy | G08B 25/08 |
| 9,946,531 B1* | 4/2018 | Fields | G06Q 40/08 |
| 9,972,054 B1* | 5/2018 | Konrardy | G07C 5/008 |
| 10,048,700 B1* | 8/2018 | Curlander | G08G 1/164 |
| 10,145,684 B1* | 12/2018 | Tofte | B64D 47/08 |
| 10,157,423 B1* | 12/2018 | Fields | B60W 40/09 |
| 10,173,690 B2* | 1/2019 | Mukai | B60W 50/0097 |
| 10,185,998 B1* | 1/2019 | Konrardy | H04W 4/90 |
| 10,246,097 B1* | 4/2019 | Fields | G06F 8/65 |
| 10,249,108 B2* | 4/2019 | Schroeder | G07C 5/0808 |
| 10,319,039 B1* | 6/2019 | Konrardy | G06Q 40/08 |
| 10,329,538 B2* | 6/2019 | Jordan | A61K 39/215 |
| 10,354,230 B1* | 7/2019 | Hanson | G07B 15/00 |
| 10,373,259 B1* | 8/2019 | Konrardy | G06Q 40/08 |
| 10,475,127 B1* | 11/2019 | Potter | B60W 40/08 |
| 10,755,356 B1* | 8/2020 | LaBarre | G06Q 40/08 |
| 10,832,331 B1* | 11/2020 | Davis | G07C 5/08 |
| 10,891,694 B1* | 1/2021 | Leise | G07C 5/0866 |
| 10,909,628 B1* | 2/2021 | Tofte | G06T 7/75 |
| 2003/0200123 A1* | 10/2003 | Burge | G06Q 40/08 703/6 |
| 2003/0233261 A1* | 12/2003 | Kawahara | G06Q 10/10 705/4 |
| 2005/0247513 A1* | 11/2005 | Turner | B62D 1/286 180/444 |
| 2006/0031103 A1* | 2/2006 | Henry | G06Q 40/08 705/4 |
| 2006/0229777 A1* | 10/2006 | Hudson | G05B 23/021 701/31.4 |
| 2007/0219720 A1* | 9/2007 | Trepagnier | G05D 1/0278 701/300 |
| 2007/0291130 A1 | 12/2007 | Broggi et al. | |
| 2009/0069953 A1 | 3/2009 | Hale et al. | |
| 2009/0303026 A1 | 12/2009 | Broggi et al. | |
| 2010/0106356 A1* | 4/2010 | Trepagnier | G05D 1/024 701/25 |
| 2010/0131304 A1* | 5/2010 | Collopy | G06Q 30/0224 705/4 |
| 2011/0241862 A1* | 10/2011 | Debouk | B60W 50/035 340/439 |
| 2011/0304733 A1 | 12/2011 | Umoh | |
| 2012/0053805 A1* | 3/2012 | Dantu | B60W 40/09 701/70 |
| 2012/0083960 A1 | 4/2012 | Zhu et al. | |
| 2013/0218604 A1 | 8/2013 | Hagelstein et al. | |
| 2013/0304513 A1 | 11/2013 | Hyde et al. | |
| 2013/0304514 A1 | 11/2013 | Hyde et al. | |
| 2014/0303827 A1* | 10/2014 | Dolgov | B60W 60/0053 701/23 |
| 2014/0310186 A1 | 10/2014 | Ricci | |
| 2014/0358324 A1 | 12/2014 | Sagar et al. | |
| 2015/0006023 A1 | 1/2015 | Fuchs | |
| 2015/0024705 A1 | 1/2015 | Rashidi | |
| 2015/0035685 A1* | 2/2015 | Strickland | B60Q 1/525 340/901 |
| 2015/0039397 A1 | 2/2015 | Fuchs | |
| 2015/0088334 A1* | 3/2015 | Bowers | G07C 5/008 701/1 |
| 2015/0088360 A1* | 3/2015 | Bonnet | B62D 15/027 701/23 |
| 2015/0088550 A1* | 3/2015 | Bowers | G06Q 40/08 705/4 |
| 2015/0158495 A1 | 6/2015 | Duncan et al. | |
| 2015/0161893 A1 | 6/2015 | Duncan et al. | |
| 2015/0166069 A1 | 6/2015 | Engelman et al. | |
| 2015/0170287 A1* | 6/2015 | Tirone | G06Q 40/08 705/4 |
| 2015/0178998 A1* | 6/2015 | Attard | G07C 5/008 701/23 |
| 2015/0187019 A1* | 7/2015 | Fernandes | G06Q 40/08 705/4 |
| 2015/0242953 A1* | 8/2015 | Suiter | G07C 5/008 705/4 |
| 2015/0338850 A1* | 11/2015 | Connor | B64C 19/00 701/30.3 |
| 2016/0082953 A1* | 3/2016 | Teller | B60W 30/08 701/23 |
| 2016/0086285 A1* | 3/2016 | Jordan Peters | G08G 1/096827 701/484 |
| 2016/0176398 A1* | 6/2016 | Prokhorov | B60W 30/09 701/23 |
| 2017/0236210 A1* | 8/2017 | Kumar | B60W 60/0053 705/4 |
| 2017/0297569 A1* | 10/2017 | Nilsson | B60T 7/18 |
| 2018/0134410 A1* | 5/2018 | Fymat | B64D 43/00 |

OTHER PUBLICATIONS

N. A. Greenblatt, "Self-driving cars and the law," in IEEE Spectrum, vol. 53, No. 2, pp. 46-51, Feb. 2016 (Year: 2016).*

"Google says it bears 'some responsibility' after self-driving car hits bus", Business Insurance, Feb. 29, 2016, pp. 1-3. (Year: 2016).*

Peterson,Robert,W, "New Technology-Old Law: Autonomous Vehicles and California's Insurance Framework",Santa Clara Review,vol. 52, No. 4, Dec. 18, 2012, pp. 1341-1399. (Year: 2012).*

Merchant,Gary;Lindor,Rachela,,"The Coming Collision Between Autonomous Vehicles and the LiabilitySystem",SantaClara Review,vol. 52, No. 4 ,Dec. 17, 2012, pp. 1321-1340.( Year: 2012).*

Verrinder,James,"As driverless trials begin, motor insureres urged to seize opportunity", PostMagazine, Feb. 19, 2015, pp. 1-2. (Year: 2015).*

J.D. Power and Associaies, "The Influence of Telematics on Customer Experience: Case Study of Progressive's Snapshot Program", McGraw Hill Financial, Copyright 2013, 3 Pages, url: http://www.jdpower.com/sites/default/files/InfluenceofTelematics%20JDPower%20Insights.pdf.

KPMG; "Self-driving cars: The next revolution", Center for Automotive Research, Copyright 2012, 36 Pages, url: https://assets.kpmg.com/content/dam/kpmg/pdf/2015/10/self-driving-cars-next-revolution_new.pdf.

Marchant et al., "The Coming Collision Between Autonomous Vehicles and the Liability System", Santa Clara Review, Dec. 17, 2012, vol. 52, No. 4, pp. 1321-1340.

Peterson, Robert W.; "New Technology-Old Law: Autonomous Vehicles and California's Insurance Framework", Santa Clara Review, Dec. 18, 2012, vol. 52, No. 4, pp. 1341-1399.

Progressive Insurance; "Linking Driving Behavior to Automobile Accidents and Insurance Rates", Jul. 2012, Progressive Snapshot, 10 Pages, url: http://www.progressive.com/Content/pdf/newsroom/snapshot_report_final_070812.pdf.

Reddy, Aala Santhosh; "The New Auto Insurance Ecosystem: Telematics, Mobility and the connected car", Cognizant, Aug. 2012, 14 Pages, url: https://www.cognizant.com/InsightsWhitepapers/The-New-Auto-Insurance-Ecosystem-Telematics-Mobility-and-the-Connected-Car.pdf.

Reifel et al.; "Telematics: The Game Changer—Reinventing Auto Insurance", Copyright 2010, A.T. Kearney, 12 Pages, url: https://www.atkearney.com/documents/10192/548707/Telematics.pdf/19079b53-8042-43ea-b870-ef42b1f033a6.

Reuters; "Google says it bears 'some responsibility' after self-driving car hits bus", Al Arabiya News, Mar. 1, 2016, 3 Pages, url: https://english.alarabiya.net/en/variety/2016/03/01/Google-bears-some-responsibility-after-self-driving-car-hit-bus.html.

(56) References Cited

OTHER PUBLICATIONS

Roberts, Les; "What is telematics insurance?", Jun. 20, 2012, MoneySupermarket, 8 Pages, url: http://www.moneysupermarket.com/c/news/what-is-telematics-insurance/0014293/.

Thom, Peter R.; "Robots take the wheel", Risk Management, New York, vol. 62, No. 2, Mar. 2, 2015, 4 Pages, url: http://www.rmmagazine.com/2015/03/02/robots-take-the-wheel/.

Verrinder, James; "Insurers urged to seize 'opportunity' as driverless cars hit UK roads", Post Magazine, Feb. 16, 2015, 4 Pages, url: https://www.postonline.co.uk/2395367/insurers-urged-to-seize-opportunity-as-driverless-cars-hit-uk-roads.

\* cited by examiner

SYSTEMS AND METHODS FOR ALLOCATING FAULT TO AUTONOMOUS VEHICLES

RELATED APPLICATIONS

This application is a continuation of, and claims the benefit of priority to, U.S. patent application Ser. No. 15/209,971, filed Jul. 14, 2016, entitled "SYSTEMS AND METHODS FOR ALLOCATING FAULT TO AUTONOMOUS VEHICLES," which claims the benefit of priority of U.S. Provisional Patent Application No. 62/360,738, filed Jul. 11, 2016, entitled "SYSTEMS AND METHODS FOR ALLOCATING FAULT TO AUTONOMOUS VEHICLES," the entire contents and disclosure of which are hereby incorporated by reference herein in their entirety.

FIELD OF THE INVENTION

The present disclosure relates to fault allocation for automobile collisions and, more particularly, to systems and methods for allocating fault among parties to a collision and adjusting auto insurance rates accordingly.

BACKGROUND

Automobiles share the roads with many other automobiles. From time to time, these automobiles may be involved in a collision with another automobile or some of other object for various reasons, such as, for example, excess speed, following too closely, or simply a lack of attention.

At least some new automobiles may include autonomous operation technology that facilitates driver-less operation of the automobile. Such autonomous vehicles may include various sensing technologies that may be used to detect the environment in which the autonomous vehicle operates. The sensing technologies may include, for example, optical sensing, radio frequency sensing, photonic, and acoustic sensing, among others. Such sensing technologies may include proximity sensing technologies that may be used to detect and indicate when the automobile gets near another automobile. Such sensor systems are generally intended to enhance the drivability and safety of the automobile. For example, some automobiles may include forward-looking and rear-looking sensors to assist in parking; side-looking sensors to facilitate blind-spot detection; side-looking sensors for lane detection; and forward looking sensors for navigation and braking systems. Autonomous vehicles may use the sensing technologies to, in some circumstances, avoid a collision among one or more other vehicles, pedestrians, cyclists, road hazards, or immovable objects.

In the automobile insurance industry, insurance policies are crafted with a variety of considerations in mind, including, the risk a given driver (i.e., the insured) represents to an auto insurance company (i.e., the insurer). A driver represents risk to an auto insurance company in terms of, for example, the likelihood the driver will be involved in a collision. An auto insurance company may consider various other factors in quantifying the risk a given driver represents, including, for example, age, vehicle, occupation, and place of residence. Autonomous vehicles, and their owners, may have substantially different risk profiles when compared to a traditional driver. For example, autonomous vehicles may be more likely to be struck by other vehicles due to the autonomous vehicle's overly cautious behavior. Such likelihood is further increased in urban traffic. Autonomous vehicles may respond differently to environmental conditions when compared to traditional drivers. In some cases, for example, an autonomous vehicle may lack the ability to safely adapt to unforeseen circumstances, such as downed power lines, flooding, or interference with sensing technology. In other cases, for example, an autonomous vehicle may perform more safely than a traditional driver under certain environmental conditions, such as rain, snow, or loose pavement.

An insurance company may be more or less likely to offer certain policy features to a driver based upon their risk. For example, an insurance company may be unwilling to offer low-deductible policies to high-risk drivers. Insurance companies often determine policy premiums according to a given driver's risk. A driver considered a low risk of collision may be offered lower premiums for a collision policy than another driver considered a higher risk of collision. Similarly, a driver who insures an expensive sports car is likely to pay higher premiums for a collision policy than another driver who insures an economy-class, four-door sedan. Likewise, an insurance company may tailor a collision policy to a particular autonomous vehicle based upon its risk profile and driving history.

BRIEF SUMMARY

The present embodiments may relate to systems and methods for allocating fault to a vehicle involved in a collision, and adjusting auto insurance rates accordingly. Many modern vehicles include various sensors for detecting the environment in which the vehicle is operating before, during, and after the collision. These sensors may include forward-looking sensors, rear-looking sensors, and side-looking sensors that may detect environmental conditions, activity of other automobiles, and activity of pedestrians. This data may be collected and analyzed to determine a fault score for the vehicle representing a percentage of fault for the collision allocated to the vehicle. In certain embodiments, further fault scores may be determined for other vehicles, pedestrians, municipalities, software providers, car makers, and environmental conditions. Fault scores may be relayed to an insurance company for adjusting an auto insurance premium based upon fault scores accumulated over time for an insured automobile, or for another entity with which a given insured automobile interacts.

In one aspect, a system for allocating fault in a collision involving a vehicle is provided. The system may include (1) a sensor coupled to the vehicle and configured to collect contextual data related to the collision, (2) a non-transitory memory configured to store the contextual data, and (3) a processor coupled to the non-transitory memory and configured to (a) gain access to the contextual data and (b) compute and assign a fault percentage to a driver of the vehicle based upon the contextual data. The system may include additional, less, or alternate functionality, including that discussed elsewhere herein.

In another aspect, a system for allocating fault in a collision involving an autonomous vehicle is provided. The system may include (1) a plurality of sensors coupled to the autonomous vehicle and configured to collect contextual data related to the collision, (2) a first processor coupled to the plurality of sensors and configured to: (a) execute a control program stored in a non-transitory memory to operate the autonomous vehicle, and (b) generate driving data representing operation of the autonomous vehicle by the first processor, and (3) a second processor coupled to the plurality of sensors and the first processor, the second processor configured to: (a) gain access to the contextual data and the driving data, and (b) compute a fault percentage for at least the autonomous vehicle. The system may include additional, less, or alternate functionality, including that discussed elsewhere herein.

In yet another aspect, a method of allocating fault in a collision involving a vehicle is provided. The method may include (1) generating driving data representing operation of the vehicle, (2) detecting contextual information using a plurality of sensors affixed to the vehicle, (3) receiving contextual data representing the contextual information at a processor, and (4) processing, by the processor, the driving data and the contextual data to compute a fault score for the vehicle, the fault score representing a percentage of fault for the collision allocated to an operator of the vehicle. The method may include additional, less, or alternate functionality, including that discussed elsewhere herein, and/or may be implemented, in whole or part, via a computer system, communication network, or one or more local or remote processors, such as those associated with a vehicle, vehicle controller, customer mobile device (e.g., smart phone), and/or insurance provider, and/or via computer-executable instructions stored on non-transitory computer-readable medium or media.

In another aspect, a premium determination system is provided. The premium determination system may include (1) a communication interface configured to (a) receive contextual data related to a collision involving at least a first vehicle and (b) receive a first fault score and a second fault score for the collision transmitted from the first vehicle, the first fault score representing a first percentage of fault allocated to the first vehicle, the second fault score representing a second percentage of fault allocated to an entity accountable for an environmental condition present at the collision, and (2) a processor coupled to the communication interface and a non-transitory medium, the non-transitory medium containing computer-executable instructions that, when executed by the processor, configure the processor to (a) accumulate respective fault scores for the first vehicle over a period of time, the accumulated fault score for the first vehicle including the first fault score for the collision, and (b) determine an auto insurance premium for the first vehicle based upon the accumulated fault score for the first vehicle. The system may include additional, less, or alternate functionality, including that discussed elsewhere herein.

In yet another aspect, a computer-implemented method of determining auto insurance rates for autonomous vehicles is provided. The computer-implemented method may include (1) receiving contextual data related to a collision involving at least a first vehicle, (2) receiving a first fault score and a second fault score for the collision transmitted from the first vehicle, the first fault score representing a first percentage of fault allocated to the first vehicle, the second fault score representing a second percentage of fault allocated to an entity accountable for an environmental condition present at the collision, (3) accumulating respective fault scores for the first vehicle over a period of time, the accumulated fault score for the first vehicle including the first fault score for the collision, and (4) determining an auto insurance premium for the first vehicle based upon the accumulated fault score for the first vehicle. The method may include additional, less, or alternate functionality, including that discussed elsewhere herein, and/or may be implemented, in whole or part, via a computer system, communication network, or one or more local or remote processors, such as those associated with a vehicle, vehicle controller, customer mobile device (e.g., smart phone), and/or insurance provider, and/or via computer-executable instructions stored on non-transitory computer-readable medium or media.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
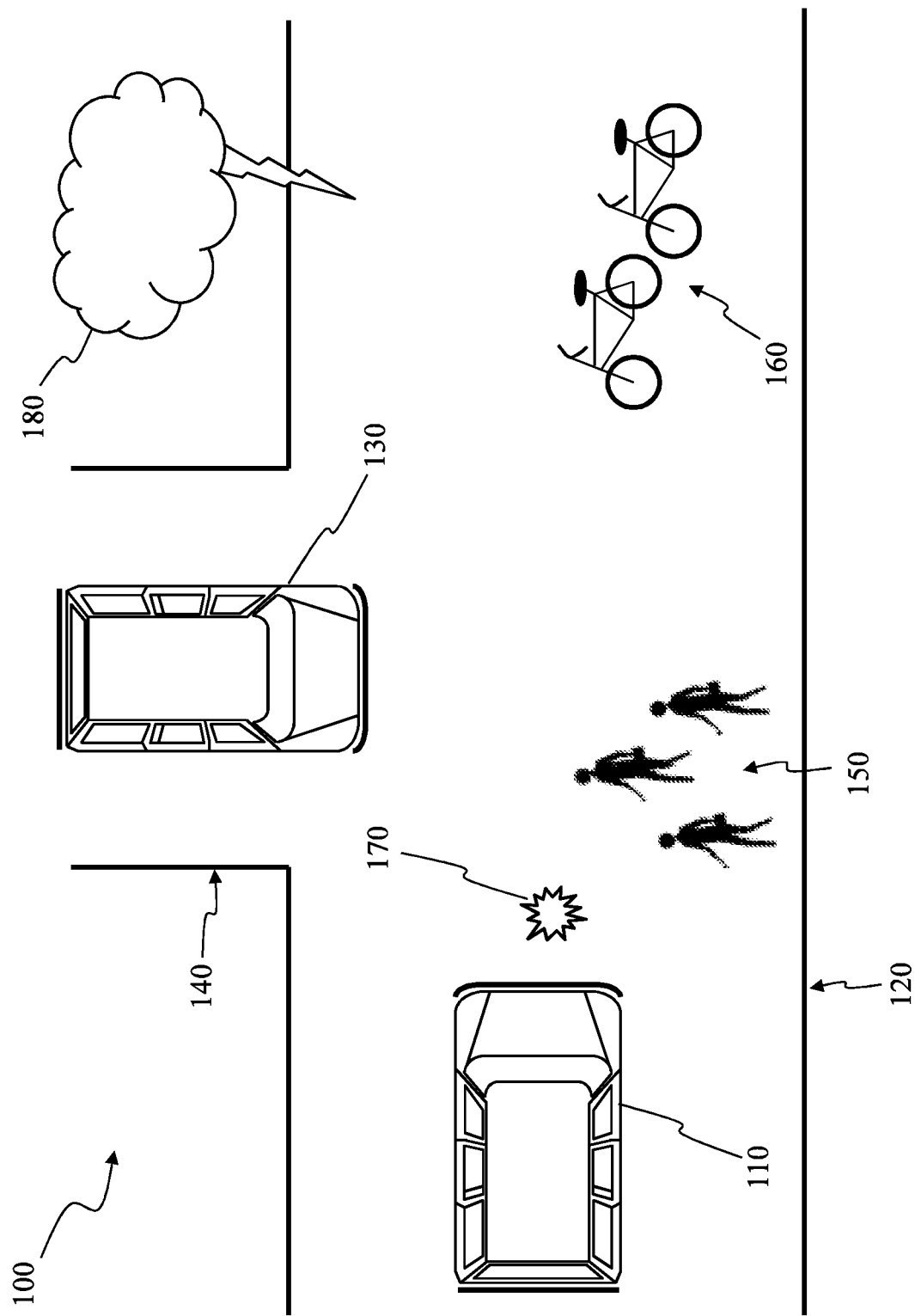
FIG. 1 depicts an exemplary collision scenario.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Auto insurance policies and premiums may be crafted based upon the insurers' quantification of insured drivers' risk. Insurance companies (i.e., insurers) utilize a variety of techniques to gauge a particular driver's or class of drivers' risk. These techniques may allow insurers to divide and subdivide insured drivers into various risk pools, where a given driver's risk pool impacts the auto insurance policies available and the premiums (and/or rates, discounts, rewards, points, etc.) at which those policies are available. These techniques may be extended to autonomous vehicles by developing risk profiles unique to autonomous vehicles and, in some cases, unique to particular makes and models of autonomous vehicles. Risk profiles for autonomous vehicles may be developed based upon driving history of the autonomous vehicle and, more specifically, fault determinations resulting from collisions involving a given autonomous vehicle, or equivalent makes and models of autonomous vehicles (assuming the software and hardware are comparable and version-controlled). Moreover, the contextual data collected by an autonomous vehicle may be used to allocate fault among all parties to a particular collision.

For example, fault allocated to a particular autonomous vehicle, its owner, or its manufacturer may be affected by the condition of the autonomous vehicle itself. More specifically, an owner may be allocated more fault in a collision due to lack of maintenance of the autonomous vehicle, its sensor systems, or safety equipment. Alternatively, more fault may be allocated to the autonomous vehicle and the owner if the autonomous vehicle has missed software updates or features that hinder safe operation of the autonomous vehicle. A manufacturer of the autonomous vehicle may be allocated fault if the autonomous vehicle itself malfunctioned. A software provider for the autonomous vehicle's systems may be allocated fault if the autonomous vehicle's system malfunctioned.

The contextual data collected by an autonomous vehicle's sensors may be used to further allocate fault among parties to a collision. Contextual data may include information regarding environmental conditions, including weather, road conditions, road hazards, road construction, and road signage, for example. Contextual data may further include a record of other vehicles' activity before, during, and after a collision. Such a record may include a video recording, digital "still" pictures, acoustic measurements, and radio frequency measurements, for example. Such contextual data may relieve the autonomous vehicle of any fault in a particular collision due to another party's wrongful act. Such wrongful acts may include other vehicles' ignoring road signage, speeding, or erratic driving, for example. Wrongful acts may include pedestrian activity, such as walking in the road or cycling. Wrongful acts may further include actions or inaction by a municipality or other entity accountable for road conditions and certain environmental conditions. Municipalities may be allocated fault for road hazards, lack of road markings, lack of road signage, or basic lack of road maintenance.

Fault scores for an autonomous vehicle may be accumulated over a period of time to develop a risk profile. For example, an autonomous vehicle involved in multiple collisions over a one year period may be assigned a risk profile based upon the accumulated fault over the multiple collisions. Further, a risk profile for a given make and model of an autonomous vehicle may be assigned a generalized risk profile based upon the accumulated fault allocated to all autonomous vehicles within the class, e.g., the same model year, the same software version, or the same recalled physical component. Further, for example, if contextual data collected over the course of several months indicates multiple collisions occurred due to an unmitigated road hazard, then the insurance company may seek a recovery from the municipality accountable for that road, or may adjust premiums for insurance policies held by that municipality.

The technical effect achieved by this system may be at least one of: (a) collecting contextual data related to a collision involving one or more vehicles, (b) computing fault for a vehicle based upon the collected contextual data, (c) computing fault for other vehicles, pedestrians, municipalities, or other parties involved in or related to a collision, (d) accumulating fault scores for autonomous vehicles, (e) developing risk profiles for autonomous vehicles generally, and for particular makes and models of autonomous vehicles, (f) reconstructing a collision based upon collected contextual data, and (g) accumulating fault scores for municipalities that provide sub-standard infrastructure support for the safe operation of autonomous vehicles.

A technical effect of the systems and processes described herein may be achieved by performing at least one of the following steps: (i) generating driving data representing operation of a vehicle; (ii) detecting contextual information using sensors affixed to the vehicle; (iii) receiving contextual data representing the contextual information; (iv) processing the driving data and the contextual data to allocate fault among parties to a collision; and (v) adjust auto insurance rates based upon accumulated fault scores over a period of time.

Exemplary Collision Scenarios

FIG. 1 depicts an exemplary collision scenario 100. Scenario 100 includes a first automobile 110 driving on a road 140. A second automobile 130 is driving on a road 140 that intersects road 120. Collision scenario 100 further includes pedestrians 150 and cyclists 160. Collision scenario 100 further includes environmental conditions, including a road hazard 170, e.g., a pot-hole, and a weather condition 180, e.g., a storm.

First automobile 110 may include forward-looking, rear-looking, and side-looking sensors, to facilitate autonomous operation of first automobile 110. Data collected by the sensors on first automobile 110 is referred to as contextual data and includes data collected regarding the position of first automobile 110, second automobile 130, pedestrians 150, and cyclists 160. Contextual data further includes information regarding road hazard 170 and weather condition 180. First automobile 110 makes driving decisions based upon the collected contextual data. As first automobile 110 is operated, driving data is generated that represents details of how first automobile 110 is being operated. Contextual data collected by first automobile 110 may be processed to allocate fault among, for example, first automobile 110, the operator or owner of first automobile 110, the manufacturer of first automobile 110, second automobile 130, pedestrians 150, cyclists 160, the municipality responsible for roads 120 and 140, and acts of nature, including weather condition 180.

For example, if second automobile 130 is operated recklessly and collides with first automobile 110, or causes first automobile 110 to collide with pedestrians 150, cyclists 160, road hazard 170, or some building or other structure along road 120, then second automobile 130 may be allocated some amount of fault in the collision. Similarly, if pedestrians 150 enter road 120 without warning and cause the collision, pedestrians 150 may be allocated fault. In both examples, first vehicle 110 may be allocated at least some fault in the collision. Further, fault in the collision may be allocated among numerous parties to the collision.

Exemplary Systems

Figure 2:
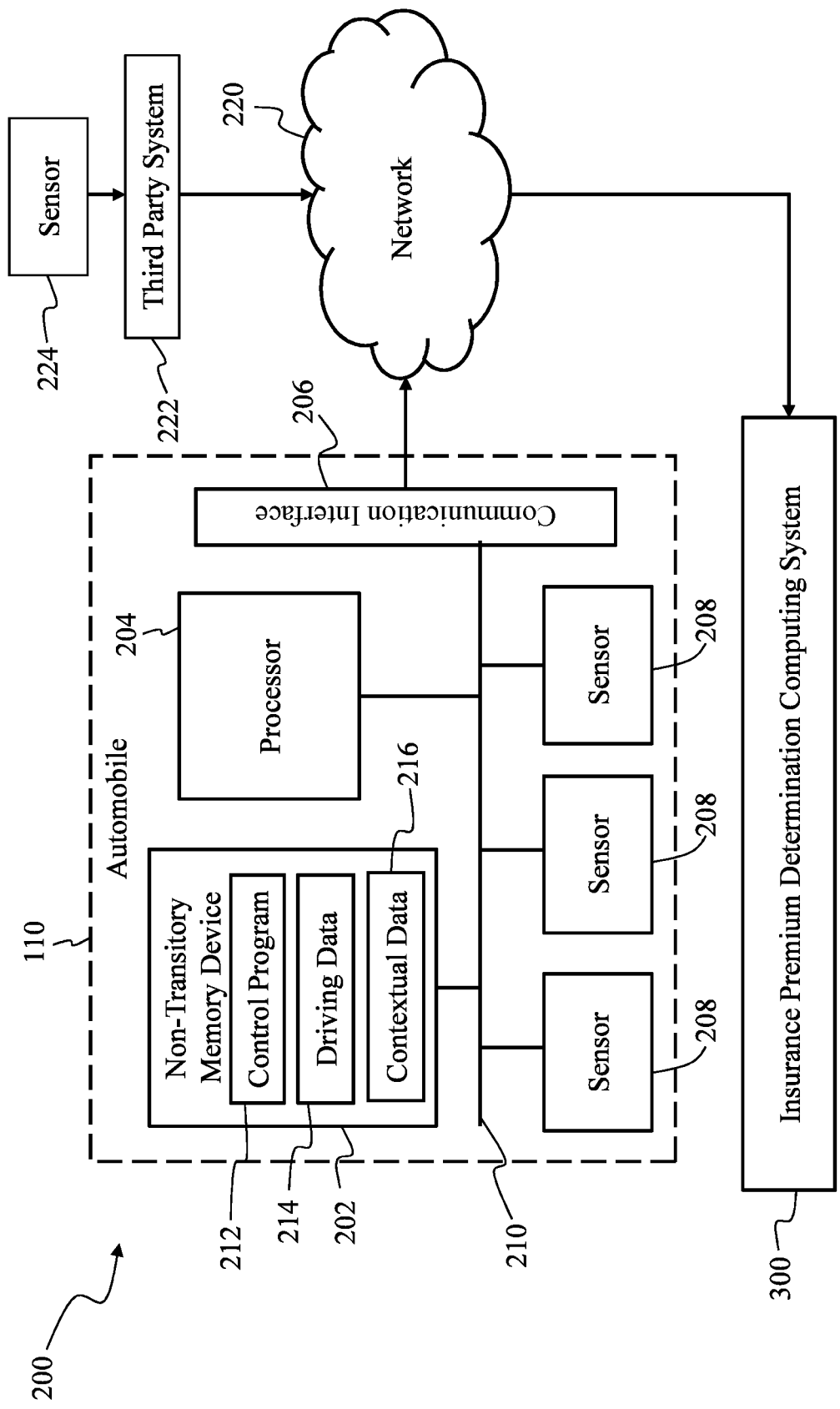
FIG. 2 depicts an exemplary system for allocating fault in a collision involving a vehicle.

FIG. 2 depicts a block diagram of an exemplary system 200 for allocating fault in a collision involving a vehicle, such as first automobile 110 (shown in FIG. 1). First automobile 110 may include a non-transitory memory device 202, a processor 204, a communication interface 206, and sensors 208. Non-transitory memory device 202, processor 204, communication interface 206, and sensors 208 are communicatively coupled to a data bus 210.

Non-transitory memory device 202 may include computer readable media and may be configured to store a control program 212 for autonomously operating first automobile 110. Non-transitory memory device 202 may be further configured to store driving data 214 representing actual operation of first automobile 110. Non-transitory memory device 202 may be further configured to store contextual data 216 related to the environment in which first automobile 110 is operating at the time of the collision.

Communication interface 206 may be configured to communicate with an insurance premium determination computing system 300 over a network 220. Insurance premium determination computing system 300 may include a processor coupled to computer readable media for the purpose of executing one or more computer programs stored on the computer readable media. Network 220 may include a wired connection, such as Ethernet, serial bus, or other suitable wired communication system, or a wireless connection, such as Wi-Fi, Bluetooth, cellular, or other radio frequency communication system.

Communication interface 206 may be further configured to communicate with a third party system 222 using network 220. Third party system 222 may include, for example, a traffic camera system, including a sensor 224 that observes first automobile 110 leading up to, during, and after the collision. Sensor 224 may be configured to collect further contextual data related to the collision and transmit the contextual data through third party system 222 and over network 220 to insurance premium determination computing system 300. System 200 may include additional, fewer, or alternate elements, including those discussed elsewhere herein.

Processor 204 may include one or more processing units configured to gain access to non-transitory memory device 202. For example, processor 204 may execute computer-executable instructions that compose control program 212 to autonomously operate first automobile 110. Processor 204 may be configured to use machine learning to operate first automobile 110. While control program 212 is executed, processor 204 may generate driving data 214 that represents the actual operation of first automobile 110.

Sensors 208 may include any suitable sensor for contributing to the autonomous operation of first automobile 110, including, for example, radio frequency sensors, acoustic sensors, optical sensors, and photonic sensors. Sensors 208 are configured to detect contextual information relating to the collision. The contextual information is stored as contextual data 216 in non-transitory memory device 202.

Processor 204 may be configured to gain access to driving data 214 and contextual data 216 to determine a fault score for first automobile 110. Processor 204 may be further configured to process contextual data 216 to determine respective fault scores for various other parties to the collision, such as, for example, second automobile 130, pedestrians 150, and cyclists 160. Processor 204 may be further configured to use machine learning to process contextual data 216 and driving data 214 to determine one or more fault scores.

Communication interface 206 may be further configured to transmit fault scores computed by processor 204 to insurance premium determination computing system 300 over network 220.

Figure 3:
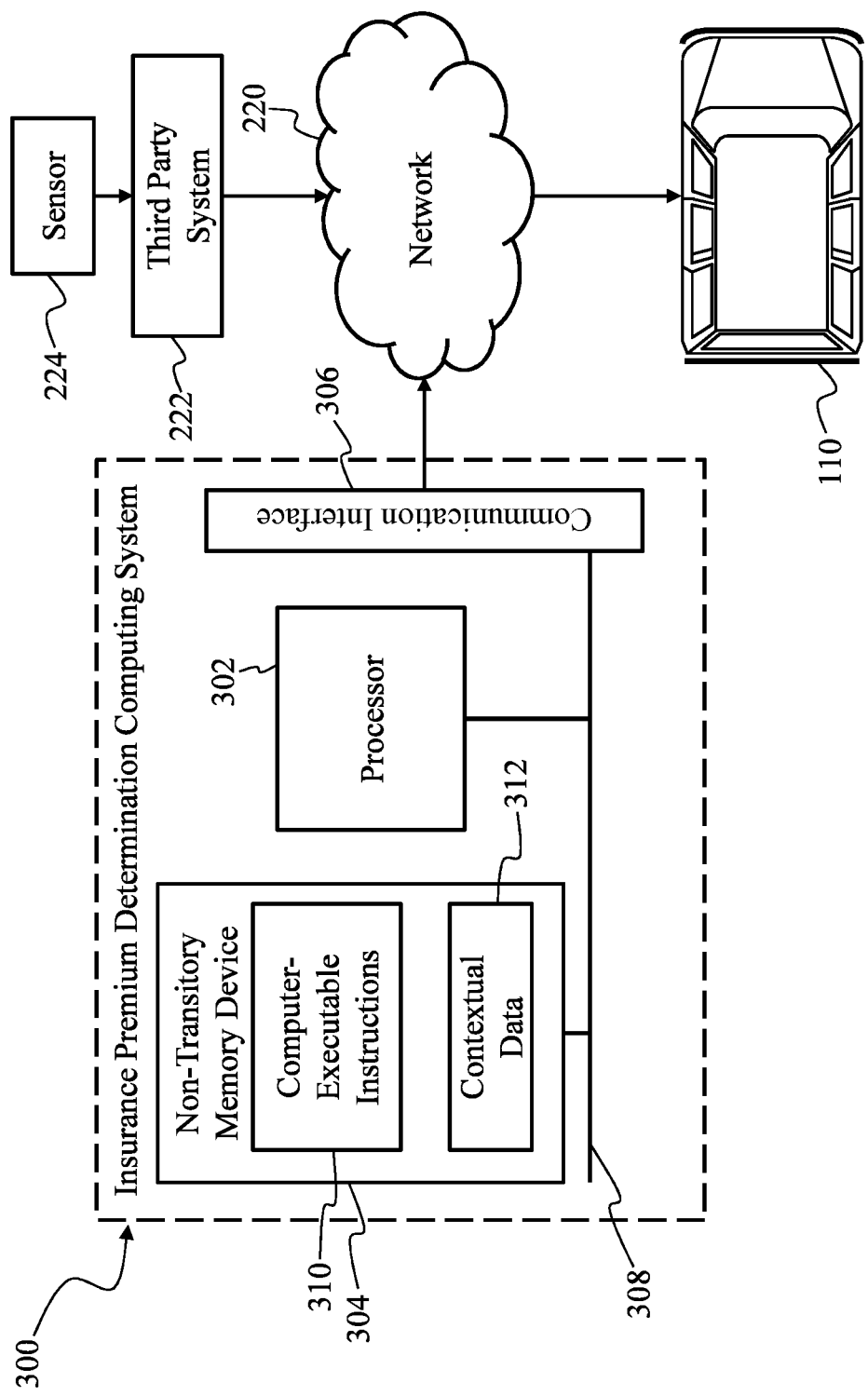
FIG. 3 depicts an exemplary insurance premium determination computing system.

FIG. 3 depicts a block diagram of an exemplary premium determination system 300. Premium determination system 300 may include a processor 302, a non-transitory memory device 304, and a communication interface 306. Processor 302, non-transitory memory device 304, and communication interface 306 are communicatively coupled to a data bus 308.

Non-transitory memory device 304 may be configured to store computer-executable instructions 310 for carrying out functions of premium determination system 300. Non-transitory memory device 304 may be further configured to store contextual data 312.

Communication interface 306 may be configured to communicatively couple insurance premium determination computing system 300 to first automobile 110 and third party system 222. Communication interface 306, for example, may be configured to receive fault scores transmitted from first automobile 110 over network 220. Communication interface 306, for example, may be further configured to receive contextual data 312 from third party system 222. Contextual data 312 may include, for example, information relating to the collision as observed by sensor 224, such as a traffic camera.

Processor 302 may be configured to accumulate fault scores for first automobile 110 over a period of time. For example, processor 302 may accumulate multiple fault scores for multiple collisions occurring over a one year period. Processor 302 may be further configured to adjust auto insurance rates for first automobile 110 based upon the accumulated fault scores. Processor 302 may be further configured to use machine learning in accumulating fault scores and determining adjustments to auto insurance rates.

Processor 302 may be further configured to accumulate fault scores for other parties to the collision, such as, for example, second automobile 130 or a municipality responsible for road hazard 170. These accumulated fault scores may be used to adjust insurance rates for second automobile 130 or a municipality. Alternatively, the accumulated fault scores may be used in a later proceeding to recover costs incurred for collisions in which the municipality was found at fault.

Exemplary Methods

Figure 4:
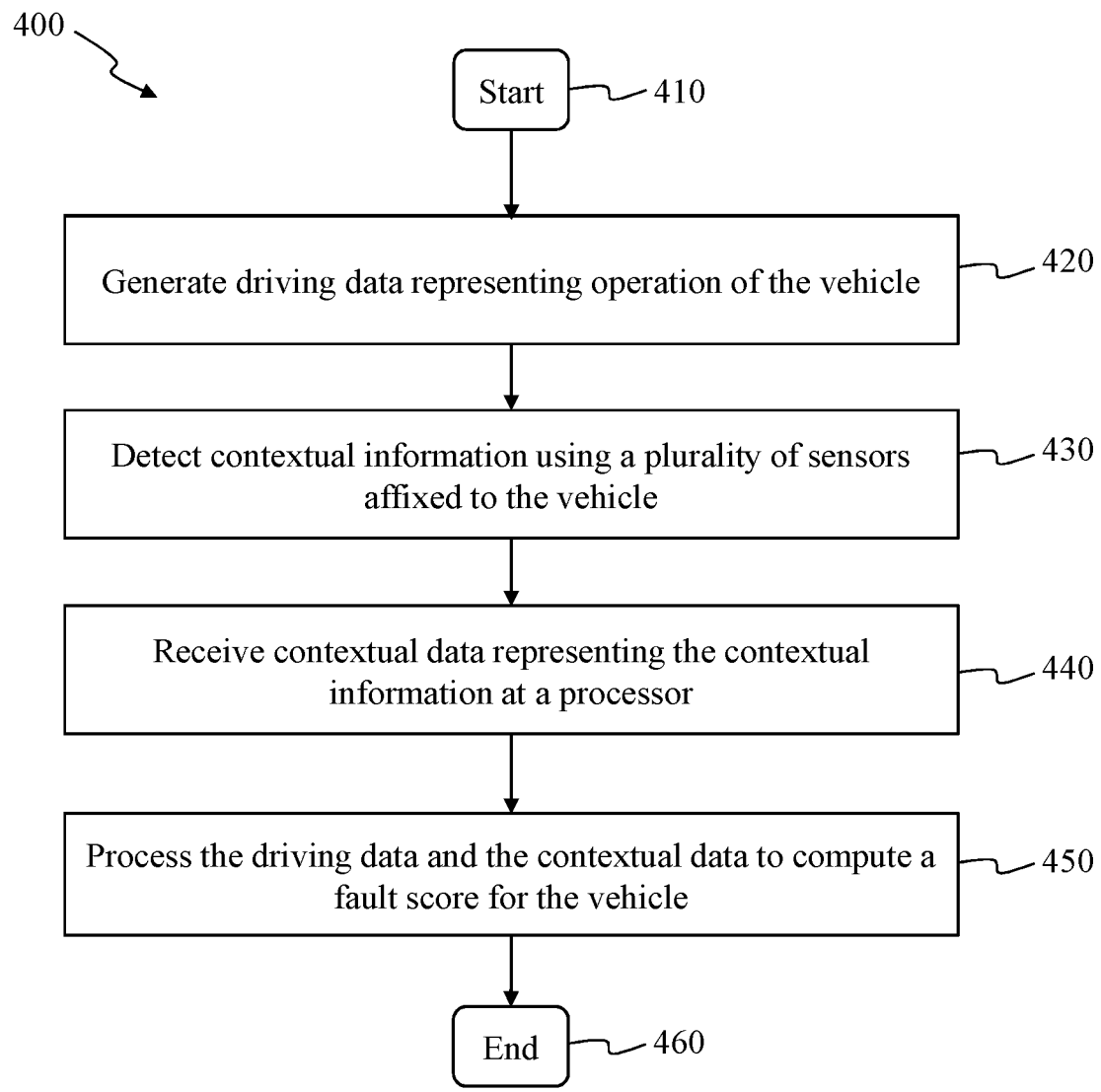
FIG. 4 depicts a flow diagram for an exemplary method of allocating fault in a collision involving a vehicle.

FIG. 4 depicts a flow diagram of an exemplary method 400 for allocating fault in a collision involving a vehicle, such as first automobile 110. Method 400 may begin at a start step 410. At a generation step 420, driving data is generated that represents actual operation of first automobile 110. The driving data may include, for example, driving speed, course, use of turn signals, lights, and safety features of first automobile 110.

At a detection step 430, sensors, such as sensors 208 (shown in FIG. 2) detect contextual information relating to the collision in which first automobile 110 is involved. Contextual information may include positions and movements of other parties to the collision, such as second automobile 130, pedestrians 150, or cyclists 160. Contextual information may further include information relating to roads 120 and 140, road hazard 170, or weather condition 180 (all shown in FIG. 1). Contextual information may be used to allocate fault among parties to the collision and provides details of the circumstances surrounding the collision.

At a receiving step 440, contextual data representing the detected contextual information is received by a processor of first automobile 110, such as processor 204 (shown in FIG. 2). At a processing step 450, processor 204 processes the driving data and the contextual data to compute a fault score for first automobile 110. Processor 204 may be configured to use machine learning in processing the driving data and the contextual data to compute the fault score.

In alternative embodiments, method 400 may further include another processing step, during which processor 204 computes a fault score for a second vehicle, such as second automobile 130 (shown in FIG. 1).

Fault scores computed by processor 204 may be transmitted from first automobile 110 to insurance premium determination computing system 300 (shown in FIGS. 2 and 3). The method may then end at an end step 460. The method may include additional, less, or alternate actions, including those discussed elsewhere herein.

Figure 5:
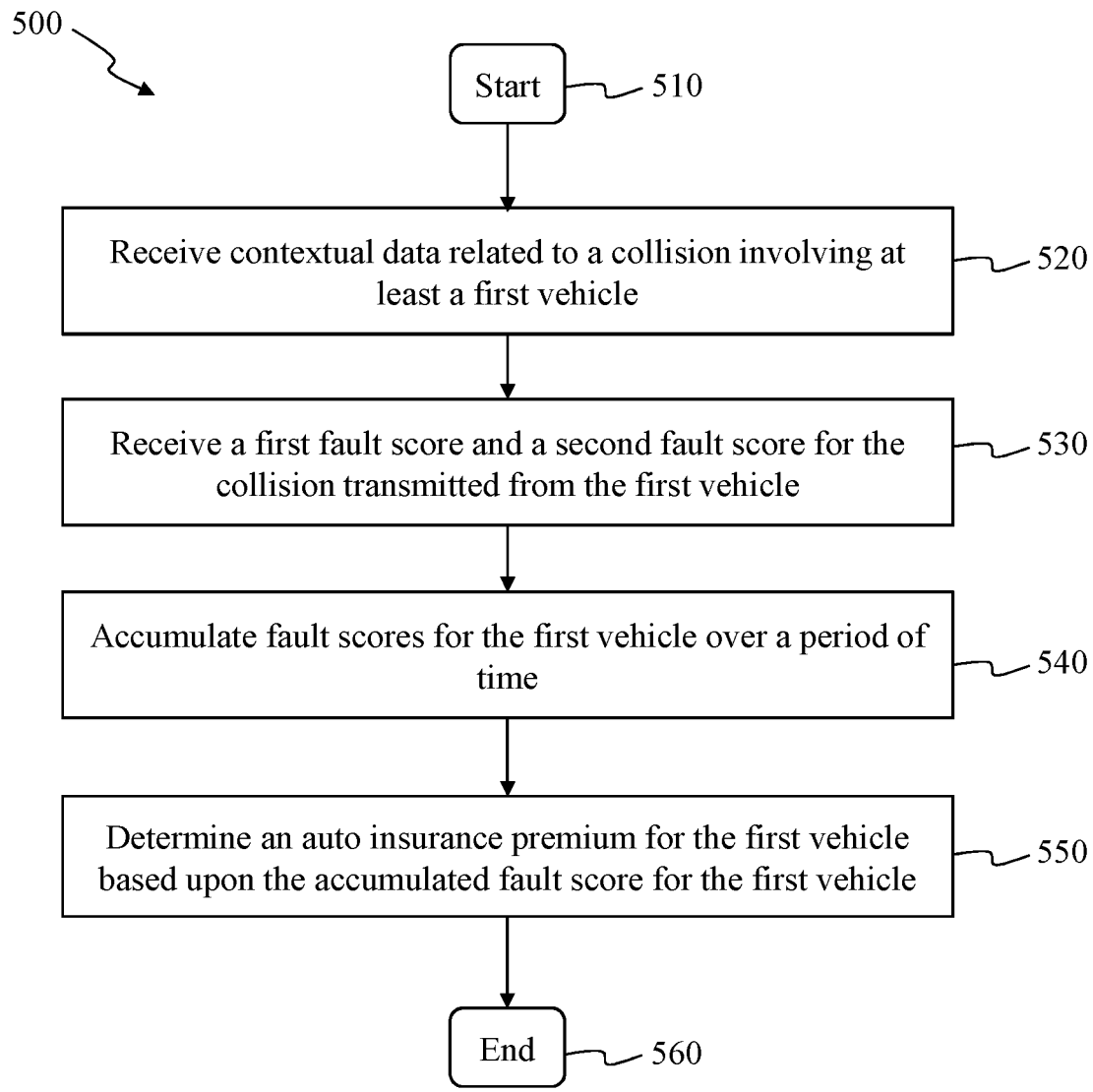
FIG. 5 depicts a flow diagram for an exemplary computer-implemented method of determining auto insurance rates for autonomous vehicles.

FIG. 5 depicts a flow diagram for an exemplary computer-implemented method 500 of determining auto insurance rates for autonomous vehicles, such as first automobile 110. The method may begin at a start step 510.

At a receiving step 520, an insurance premium determination computing system, such as insurance premium determination computing system 300 (shown in FIGS. 2 and 3), receives contextual data related to a collision involving at least one vehicle, such as first automobile 110. The contextual data may be received from a third party system that collects data using sensors, such as third party system 222 and sensor 224 (shown in FIG. 2). Such a third party system may include a traffic camera system, for example.

At a receiving step 530, insurance premium determination computing system 300 receives a first fault score and a second fault score for the collision. The first and second fault scores may have been determined and transmitted from first automobile 110. At an accumulation step 540, insurance premium determination computing system 300 accumulates fault scores for first automobile 110 over a period of time. At a determination step 550, insurance premium determination computing system 300 determines an auto insurance premium for first automobile 110 based upon the accumulated fault scores.

In alternative embodiments, method 500 may include another accumulation step where fault scores for a second vehicle, such as second automobile 130, are accumulate over a period of time for the purpose of adjusting auto insurance rates for second automobile 130.

In further alternative embodiments, method 500 may include accumulation of fault scores for a municipality or other entity that is accountable for certain environmental conditions related to the collision. For example, a municipality may be accountable for disrepair of road 120 or road 140 (shown in FIG. 1). The municipality may be allocated additional fault for certain collisions if the disrepair persists over a certain period of time. The method may end at an end step 670. The method may include additional, less, or alternate actions, including those discussed elsewhere herein.

Exemplary Machine Learning

As discussed above, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as contextual data or driving data) in order to facilitate making predictions for subsequent data (again, such as contextual data or driving data). Models may be created based upon example inputs of data in order to make valid and reliable predictions for novel inputs.

Additionally or alternatively, the machine learning programs may be trained by inputting sample data sets or certain data into the programs, such as contextual data or driving data, insurance-related data, financial or value data, and other data discuss herein. The machine learning programs may utilize deep learning algorithms are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Embodiments

The present embodiments may also involve adjusting pay-as-you-go or mileage-based auto insurance. For instance, the telematics data gathered may be used to adjust distance-based vehicle insurance, such as disclosed by U.S. Pat. No. 8,799,036 (entitled "Systems and Methods for Analyzing Vehicle Operation Data to Facilitate Insurance Policy Processing"), which is incorporated herein by reference in its entirety.

Driving tips may be provided to the driver based upon telematics data, which are intended to improve driving safety and reduce accident risk, such as disclosed by U.S. Pat. No. 8,935,036 (entitled "Systems and Methods for Updating a Driving Tip Model Using Telematics Data"), which is incorporated herein by reference in its entirety.

Telematics data collection may be started and stopped in response to trigger events (e.g., vehicle engine RPM, vehicle movement), such as disclosed by U.S. Pat. No. 8,930,231 (entitled "Methods Using a Mobile Device to Provide Data for Insurance Premiums to a Remote Computer"), which is incorporated herein by reference in its entirety. Notable driving events may be identified, and a fault score (and an insurance premium) may be calculated from the telematics data, which may include the driving and contextual data discussed herein in one embodiment.

Driving data may be collected via one or more accelerometers, and a driving session report may be generated that includes a student driver (i) acceleration skill score, (ii) braking skill score, and (iii) steering skill score, such as disclosed by U.S. Pat. No. 8,876,535 (entitled "Real-time Driver Observation and Scoring for Driver's Education"), which is incorporated herein by reference in its entirety. In one embodiment, a driving distance score may be calculated from the distance or proximity data discussed herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or objectoriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program may be provided, and the program may be embodied on a computer readable medium. In an exemplary embodiment, the system may be executed on a single computer system, without requiring a connection to a sever computer. In a further embodiment, the system may be run in a Windows® environment (Windows is a registered trademark of Microsoft Corporation, Redmond, Wash.). In yet another embodiment, the system may be run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. An autonomous vehicle system for allocating fault in a collision involving an autonomous vehicle, the autonomous vehicle system comprising:
   the autonomous vehicle;
   a plurality of sensors affixed to the autonomous vehicle; and
   an autonomous vehicle computing device coupled to the autonomous vehicle, the autonomous vehicle computing device comprising i) a non-transitory memory for at least storing driving data and contextual data collected by the plurality of sensors, and ii) a processor in communication with the non-transitory memory and the plurality of sensors,
   wherein the plurality of sensors are configured to:
      detect the driving data and the contextual data including driving conditions associated with the autonomous vehicle and related to the collision involving the autonomous vehicle, and
      transmit, to the processor, the driving data and the contextual data, and
   wherein the processor is configured to:
      execute a stored control program configured to operate the autonomous vehicle,
      during execution of the stored control program, generate other driving data including driving information representing an operation of the autonomous vehicle during the execution of the stored control program,
      determine that the collision involving the autonomous vehicle has occurred,
      in response to the collision being determined, analyze the driving data and the contextual data, and
      compute and assign, based upon the contextual data and the driving data, a first fault score for the autonomous vehicle, and a second fault score for at least one other participant of the collision, wherein the first fault score is reduced at least in proportion to the second fault score.

2. The autonomous vehicle system of claim 1, wherein the plurality of sensors are further configured to detect activity of the at least one other participant to the collision, the activity including activity prior to the collision and activity during the collision.

3. The autonomous vehicle system of claim 1, wherein at least one sensor of the plurality of sensors comprises an optical sensor, and wherein the first fault score and the second fault score total one hundred percent.

4. The autonomous vehicle system of claim 1, wherein at least one sensor of the plurality of sensors is further configured to detect a condition of an environment in which the collision occurs.

5. The autonomous vehicle system of claim 4, wherein at least one sensor of the plurality of sensors comprises an acoustic sensor for detecting the condition of the environment.

6. The autonomous vehicle system of claim 4, wherein the condition of the environment includes a road condition.

7. The autonomous vehicle system of claim 1, wherein the processor is further configured to:
   write the driving data to the non-transitory memory;

assign the first fault score assigned to the autonomous vehicle based upon the driving data; and alter the first fault score when the contextual data indicates that a condition of an environment contributed to the collision.

8. The autonomous vehicle system of claim 1, wherein the processor is further configured to:

compute and assign, based upon the contextual data and the driving data, a third fault score for one or more non-participants of the collision, wherein the at least one other participant and the one or more non-participants are at least one of a pedestrian, a cyclist, a condition of an environment, and a government entity, and wherein the first fault score for the autonomous vehicle is reduced in proportion to the second fault score and the third fault score.

9. The autonomous vehicle system of claim 1, wherein the processor is associated with a server.

10. The autonomous vehicle system of claim 1, wherein the processor is associated with a vehicle controller of the autonomous vehicle.

11. A computer-implemented method for allocating fault in a collision involving an autonomous vehicle, said method implemented using an autonomous vehicle computing device including a non-transitory memory and a processor in communication with the non-transitory memory and a plurality of sensors affixed to the autonomous vehicle, said method comprising:

executing, by the processor, a stored control program configured to operate the autonomous vehicle;

during execution of the stored control program, generating, by the processor, other driving data including driving information representing an operation of the autonomous vehicle during the execution of the stored control program;

receiving, by the processor, driving data and contextual data collected by at least one of the plurality of sensors, the contextual data including driving conditions associated with the autonomous vehicle and related to the collision involving the autonomous vehicle;

determining, by the processor, that the collision involving the autonomous vehicle has occurred;

in response to the collision being determined, analyzing, by the processor, the driving data and the contextual data; and computing and assigning, by the processor based upon the contextual data and the driving data, a first fault score for the autonomous vehicle, and a second fault score for at least one other participant of the collision, wherein the first fault score is reduced at least in proportion to the second fault score.

12. The method of claim 11 further comprising detecting, by the plurality of sensors, activity of the at least one other participant to the collision, the activity including activity prior to the collision and activity during the collision.

13. The method of claim 11, wherein at least one sensor of the plurality of sensors comprises an optical sensor, and wherein the first fault score and the second fault score total one hundred percent.

14. The method of claim 11, wherein at least one sensor of the plurality of sensors is further configured to detect a condition of an environment in which the collision occurs.

15. The method of claim 11, wherein the autonomous vehicle computing device is at least one of a remote server and a vehicle controller of the autonomous vehicle.

16. The method of claim 11 further comprising:

writing, by the processor, the driving data to the non-transitory memory;

assigning, by the processor, the first fault score assigned to the autonomous vehicle based upon the driving data; and altering, by the processor, the first fault score when the contextual data indicates that a condition of an environment contributed to the collision.

17. The method of claim 11 further comprising:

computing and assigning, by the processor based upon the contextual data and the driving data, a third fault score for one or more non-participants of the collision, wherein the at least one other participant and the one or more non-participants are at least one of a pedestrian, a cyclist, a condition of an environment, and a government entity, and wherein the first fault score for the autonomous vehicle is reduced in proportion to the second fault score and the third fault score.

18. A non-transitory computer readable medium having computer-executable instructions embodied thereon, when executed by an autonomous vehicle computing device coupled to an autonomous vehicle and having a non-transitory memory, and a processor in communication with the non-transitory memory and a plurality of sensors affixed to the autonomous vehicle, wherein the computer-executable instructions cause the processor configured to:

receive driving data and contextual data collected by at least one of the plurality of sensors, the contextual data including driving conditions associated with the autonomous vehicle and related to a collision involving the autonomous vehicle;

execute a stored control program configured to operate the autonomous vehicle;

during execution of the stored control program, generate other driving data including driving information representing an operation of the autonomous vehicle during the execution of the stored control program;

determine that the collision involving the autonomous vehicle has occurred;

in response to the collision being determined, analyze the driving data and the contextual data; and compute and assign, based upon the contextual data and the driving data, a first fault score for the autonomous vehicle, and a second fault score for at least one other participant of the collision, wherein the first fault score is reduced at least in proportion to the second fault score.

* * * * *